(12) United States Patent
Lin et al.

(10) Patent No.: US 12,470,134 B2
(45) Date of Patent: Nov. 11, 2025

(54) RESONANT CONVERTER HAVING SWITCH ON-TIME CONTROL MECHANISM

(71) Applicant: National Taiwan University of Science and Technology, Taipei (TW)

(72) Inventors: Jing-Yuan Lin, New Taipei (TW); Yan-Cheng Hou, Chiayi County (TW); Yi-Feng Lin, Yilan County (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 227 days.

(21) Appl. No.: 18/395,722

(22) Filed: Dec. 25, 2023

(65) Prior Publication Data

US 2025/0141347 A1 May 1, 2025

(30) Foreign Application Priority Data

Oct. 31, 2023 (TW) .................................. 112141667

(51) Int. Cl.
*H02M 3/00* (2006.01)
*H02M 3/335* (2006.01)

(52) U.S. Cl.
CPC ......... *H02M 3/01* (2021.05); *H02M 3/33573* (2021.05); *H02M 3/33576* (2013.01)

(58) Field of Classification Search
CPC .... H20M 3/01; H02M 3/335; H02M 3/33573; H02M 3/33576
See application file for complete search history.

(56) References Cited

U.S. PATENT DOCUMENTS

| 9,455,641 B2 | 9/2016 | Kondo et al. |
| 2015/0229219 A1* | 8/2015 | Choi ................... H02M 3/01 |
| | | 363/21.02 |
| 2017/0063251 A1 | 3/2017 | Ye et al. |
| | (Continued) | |

FOREIGN PATENT DOCUMENTS

| CN | 111786568 A | 10/2020 |
| CN | 112202336 A | 1/2021 |
| CN | 114465481 A | 5/2022 |

OTHER PUBLICATIONS

Ning-Zhi Jin, Yu Feng, Ze-Yu Chen and Xiao-Gang Wu, "Bidirectional CLLLC Resonant Converter Based on Frequency-Conversion and Phase-Shift Hybrid Control", MDPI, Mar. 29, 2023 (Mar. 29, 2023), pp. 1-14.

*Primary Examiner* — Gary L Laxton
(74) *Attorney, Agent, or Firm* — Li & Cai Intellectual Property Office

(57) ABSTRACT

A resonant converter having a switch on-time control mechanism is provided. The resonant converter includes a primary-side switch circuit, a primary-side resonant circuit, a secondary-side switch circuit, a secondary-side resonant circuit, a transformer and a control circuit. In the resonant converter, the control circuit controls on-times and switching frequencies of the primary-side switch circuit and the secondary-side switch circuit to extend time within which power is transmitted from an input power source, the primary-side switch circuit, the primary-side resonant circuit and the transformer to the secondary-side resonant circuit, and stored in the secondary-side resonant circuit. As a result, the secondary-side resonant circuit is able to supply more power to a load.

10 Claims, 6 Drawing Sheets

(56) References Cited

U.S. PATENT DOCUMENTS

| | | | |
|---|---|---|---|
| 2018/0367051 A1 | 12/2018 | Agamy et al. | |
| 2024/0380302 A1* | 11/2024 | Mishima | H02M 3/01 |
| 2024/0429828 A1* | 12/2024 | Moon | H02M 3/01 |
| 2024/0429830 A1* | 12/2024 | Okagawa | H02M 3/28 |
| 2025/0105730 A1* | 3/2025 | Li | H02M 3/01 |
| 2025/0121715 A1* | 4/2025 | D'Authier | H02M 3/01 |
| 2025/0260329 A1* | 8/2025 | Weng | H02M 3/33584 |

* cited by examiner

RESONANT CONVERTER HAVING SWITCH ON-TIME CONTROL MECHANISM

CROSS-REFERENCE TO RELATED PATENT APPLICATION

This application claims the benefit of priority to Taiwan Patent Application No. 112141667, filed on Oct. 31, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a resonant converter, and more particularly to a resonant converter having a switch on-time control mechanism.

BACKGROUND OF THE DISCLOSURE

A standard battery charging DC voltage range of a vehicle system is 50V to 1000V. A synchronous rectification architecture is disposed on a primary-side and a secondary-side of a transformer inside a conventional capacitor-inductor-inductor-capacitor (CLLC) resonant converter. The synchronous rectification architecture of the conventional CLLC resonant converter includes a plurality of switch components. Switching frequencies of the switch components of the conventional CLLC resonant converter are modulated for adjusting a gain of an output voltage of the conventional CLLC resonant converter. However, the conventional CLLC resonant converter has unavoidable disadvantages. For example, in order to realize a wide output voltage range and a high voltage gain of the conventional CLLC resonant converter, the switching frequency of the switch components of the conventional CLLC resonant converter is significantly changed, such that a difference between a resonant frequency and the switching frequency of the conventional CLLC resonant converter is increased. As a result, a decoupling time interval of the transformer of the conventional CLLC resonant converter is increased, which causes an increase in a circulating current flowing through the switch components on the primary-side of the conventional CLLC resonant converter. When the switch components of the conventional CLLC resonant converter are turned on, loss occurs for energy of resonant components of the conventional CLLC resonant converter such that an efficiency of the conventional CLLC resonant converter is affected.

SUMMARY OF THE DISCLOSURE

In response to the above-referenced technical inadequacies, the present disclosure provides a resonant converter having a switch on-time control mechanism. The resonant converter includes a primary-side switch circuit, a primary-side resonant circuit, a secondary-side switch circuit, a secondary-side resonant circuit, a transformer and a control circuit. The primary-side switch circuit includes a plurality of primary-side upper switches and a plurality of primary-side lower switches. A first terminal of each of the plurality of primary-side upper switches is connected to a positive terminal of an input power source. Second terminals of the plurality of primary-side upper switches are connected to first terminals of the plurality of primary-side lower switches respectively. A second terminal of each of the plurality of primary-side lower switches is connected to a negative terminal of the input power source. The primary-side resonant circuit is connected to nodes between the second terminals of the plurality of primary-side upper switches and the first terminals of the plurality of primary-side lower switches. The secondary-side switch circuit includes a plurality of secondary-side upper switches and a plurality of secondary-side lower switches. A first terminal of each of the plurality of secondary-side upper switches is connected to a first terminal of a load. Second terminals of the plurality of secondary-side upper switches are connected to first terminals of the plurality of secondary-side lower switches, respectively. A second terminal of each of the plurality of secondary-side lower switches is connected to a second terminal of the load. The secondary-side resonant circuit is connected to nodes between the second terminals of the plurality of secondary-side upper switches and the first terminals of the plurality of secondary-side lower switches. A primary-side of the transformer is connected to the primary-side resonant circuit. A secondary-side of the transformer is connected to the secondary-side resonant circuit. The control circuit is connected to a control terminal of each of the plurality of primary-side upper switches, a control terminal of each of the plurality of primary-side lower switches, a control terminal of each of the plurality of secondary-side upper switches and a control terminal of each of the plurality of secondary-side lower switches. The control circuit controls on-times and switching frequencies of the primary-side switch circuit and the secondary-side switch circuit to extend time within which power is transmitted from the input power source through the primary-side switch circuit, the primary-side resonant circuit and the transformer to the secondary-side resonant circuit, and stored in the secondary-side resonant circuit, such that the secondary-side resonant circuit supplies more power to the load.

As described above, the present disclosure provides the resonant converter having the switch on-time control mechanism. The resonant converter of the present disclosure modulates the on-times and the switching frequencies of the primary-side switch circuit and the secondary-side switch circuit. The resonant converter of the present disclosure is switched between the half-bridge control mode and the secondary-side delay conduction mode. In the half-bridge control mode, the voltage inputted into the resonant converter of the present disclosure is half of the input voltage, thereby reducing an operational frequency range. In the secondary-side delay conduction mode, on-time of the secondary-side circuit of the resonant converter of the present disclosure is delayed such that the secondary-side circuit is transitorily in the short-circuit state. At this time, the voltage of the resonant slot of the resonant converter of the present disclosure is large and a peak value of a resonant current of the resonant slot is increased. Therefore, when an operational frequency of the resonant converter of the present disclosure exceeds a resonant frequency range, the resonant converter of the present disclosure can still realize a boost function, the operational frequency range of the resonant converter of the present disclosure can be reduced, and a wide output voltage range of the present disclosure can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
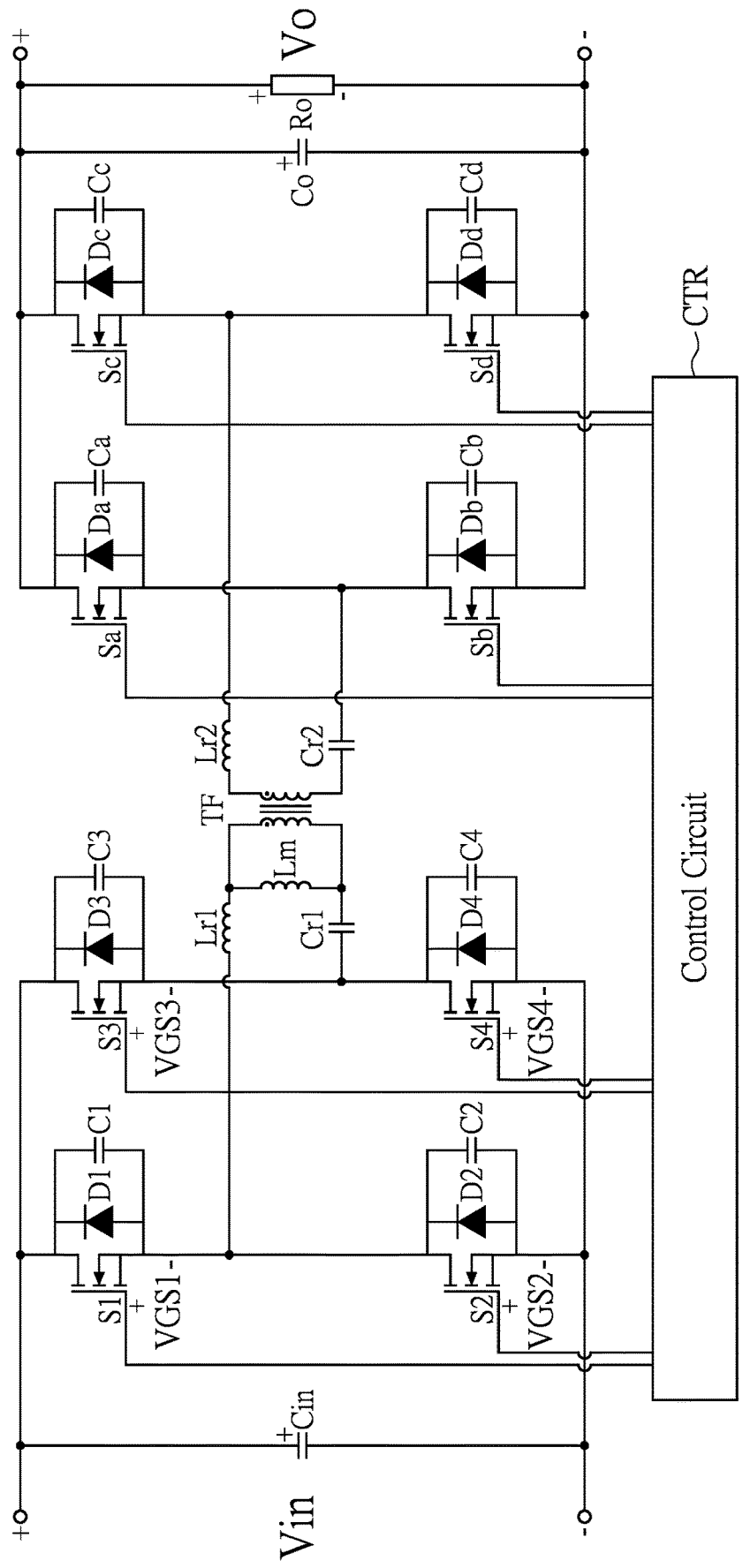
FIG. 1 is a circuit diagram of a resonant converter having a switch on-time control mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a resonant converter having a switch on-time control mechanism according to an embodiment of the present disclosure.

The resonant converter of the embodiment of the present disclosure includes a control circuit CTR, a transformer TF, a primary-side circuit and a secondary-side circuit. The primary-side circuit includes a primary-side switch circuit and a primary-side resonant circuit. The secondary-side circuit includes a secondary-side switch circuit and a secondary-side resonant circuit.

The control circuit CTR controls on-times and switching frequencies of the primary-side switch circuit and the secondary-side switch circuit to extend time within which power is transmitted from an input power source Vin through the primary-side switch circuit, the primary-side resonant circuit, and the transformer to the secondary-side resonant circuit and stored in the secondary-side resonant circuit. As a result, the secondary-side resonant circuit supplies more power to a load Ro.

The primary-side resonant circuit of the resonant converter of the present disclosure includes a first resonant capacitor Cr1, a first resonant inductor Lr1 and a magnetizing inductor Lm as shown in FIG. 1. The secondary-side resonant circuit of the resonant converter of the present disclosure includes a second resonant capacitor Cr2 and a second resonant inductor Lr2 as shown in FIG. 1. Therefore, the resonant converter of the present disclosure is a capacitor-inductor-inductor-capacitor (CLLC) resonant converter.

The primary-side switch circuit of the resonant converter of the present disclosure includes a plurality of primary-side upper switches such as a first high-side switch S1 and a second high-side switch S3 as shown in FIG. 1, and includes a plurality of primary-side lower switches such as a first low-side switch S2 and second low-side switch S4 as shown in FIG. 1.

The secondary-side switch circuit of the resonant converter of the present disclosure includes a plurality of secondary-side upper switches such as a third high-side switch Sa and a fourth high-side switch Sc as shown in FIG. 1, and includes a plurality of primary-side lower switches such as a third low-side switch Sb and a fourth low-side switch Sd as shown in FIG. 1.

A first terminal of the first high-side switch S1 and a first terminal of the second high-side switch S3 are connected to a positive terminal of the input power source Vin. A first terminal of the third high-side switch Sa and a first terminal of the fourth high-side switch Sc may be connected to a first terminal (such as a positive power receiving terminal) of the load Ro. In the embodiment, the load Ro includes a battery, but the present disclosure is not limited thereto. In practice, the battery may be replaced with other power receiving devices or components as the load Ro, depending on actual requirements.

A first terminal of the first low-side switch S2 is connected to a second terminal of the first high-side switch S1. A first terminal of the second low-side switch S4 is connected to a second terminal of the second high-side switch S3. A second terminal of the first low-side switch S2 and a second terminal of the second low-side switch S4 are connected to a negative terminal of the input power source Vin. A first terminal of the third low-side switch Sb is connected to a second terminal of the third high-side switch Sa. A first terminal of the fourth low-side switch Sd is connected to a second terminal of the fourth high-side switch Sc. A second terminal of the third low-side switch Sb and a second terminal of the fourth low-side switch Sd may be a second terminal (such as a negative power receiving terminal) of the load Ro.

A first terminal of the first resonant inductor Lr1 is connected to a node between the first terminal of the first low-side switch S2 and the second terminal of the first high-side switch S1. A first terminal of the magnetizing inductor Lm is connected to a second terminal of the first resonant inductor Lr1. A second terminal of the magnetizing inductor Lm is connected to a second terminal of the first resonant capacitor Cr1. A first terminal of the first resonant capacitor Cr1 is connected to a node between the first terminal of the second low-side switch S4 and the second terminal of the second high-side switch S3.

A first terminal of a primary-side of the transformer TF (that is an upper terminal of the primary-side of the transformer TF, as shown in FIG. 1) is connected to the first terminal of the magnetizing inductor Lm and the second terminal of the first resonant inductor Lr1. A second terminal of the primary-side of the transformer TF (that is a lower terminal of the primary-side of the transformer TF, as shown in FIG. 1) is connected to the second terminal of the magnetizing inductor Lm and the second terminal of the first resonant capacitor Cr1.

A first terminal of the second resonant inductor Lr2 is connected to a first terminal of a secondary-side of the transformer TF (that is an upper terminal of the secondary-side of the transformer TF, as shown in FIG. 1). A second terminal of the second resonant inductor Lr2 is connected to a node between the first terminal of the fourth low-side switch Sd and the second terminal of the fourth high-side switch Sc.

A first terminal of the second resonant capacitor Cr2 is connected to a second terminal of the secondary-side of the transformer TF (that is a lower terminal of the secondary-side of the transformer TF, as shown in FIG. 1). A second terminal of the second resonant capacitor Cr2 is connected to a node between the first terminal of the third low-side switch Sb and the second terminal of the third high-side switch Sa.

If necessary, the resonant converter of the present disclosure may further include an input capacitor Cin, an output capacitor Co or a combination thereof.

A first terminal of the input capacitor Cin is connected to the positive terminal of the input power source Vin, the first terminal of the first high-side switch S1 and the first terminal of the second high-side switch S3. A second terminal of the input capacitor Cin is connected to the negative terminal of the input power source Vin, the second terminal of the first low-side switch S2 and the second terminal of the second low-side switch S4.

A first terminal of the output capacitor Co is connected to the first terminal of the third high-side switch Sa and the first terminal of the fourth high-side switch Sc, and may be connected to the first terminal (such as the positive power receiving terminal) of the load Ro.

A second terminal of the output capacitor Co is connected to the second terminal of the third low-side switch Sb and the second terminal of the fourth low-side switch Sd, and may be connected to the second terminal (such as the negative power receiving terminal) of the load Ro.

The control circuit CTR is connected to a control terminal of the first high-side switch S1, a control terminal of the first high-side switch S1, a control terminal of the third high-side switch Sa and a control terminal of the fourth high-side switch Sc. In addition, the control circuit CTR is connected to a control terminal of the first low-side switch S2, a control terminal of the second low-side switch S4, a control terminal of the third low-side switch Sb and a control terminal of the fourth low-side switch Sd.

The control circuit CTR may output a plurality of control signals respectively to the control terminal of the first high-side switch S1, the control terminal of the second high-side switch S3, the control terminal of the third high-side switch Sa, the control terminal of the fourth high-side switch Sc, the control terminal of the first low-side switch S2, the control terminal of the second low-side switch S4, the control terminal of the third low-side switch Sb and the control terminal of the fourth low-side switch Sd. The control circuit CTR controls the first high-side switch S1, the second high-side switch S3, the first low-side switch S2, the second low-side switch S4, the third high-side switch Sa, the fourth high-side switch Sc, the third low-side switch Sb and the fourth low-side switch Sd.

The control circuit CTR may modulate frequencies of the plurality of control signals that are outputted respectively to the control terminal of the first high-side switch S1, the control terminal of the second high-side switch S3, the control terminal of the third high-side switch Sa, the control terminal of the fourth high-side switch Sc, the control terminal of the first low-side switch S2, the control terminal of the second low-side switch S4, the control terminal of the third low-side switch Sb and the control terminal of the fourth low-side switch Sd. As a result, on-times and switching frequencies of the first high-side switch S1, the second high-side switch S3, the first low-side switch S2, the second low-side switch S4, the third high-side switch Sa, the fourth high-side switch Sc, the third low-side switch Sb and the fourth low-side switch Sd are modulated for controlling the amount of the power that is supplied from the resonant converter of the present disclosure to the load Ro and an efficiency of supplying the power.

Figure 2:
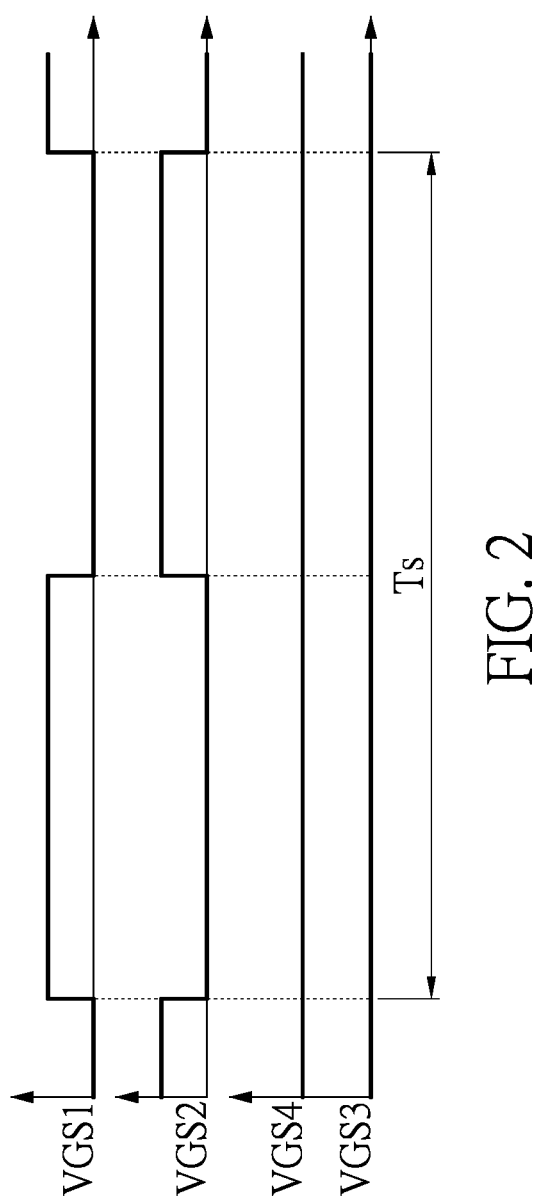
FIG. 2 is a waveform diagram of signals of the resonant converter being operated in a half-bridge control mode according to the embodiment of the present disclosure.

Reference is made to FIG. 1 and FIG. 2, in which FIG. 2 is a waveform diagram of signals of the resonant converter being operated in a half-bridge control mode according to the embodiment of the present disclosure.

The resonant converter of the present disclosure may be switched to the half-bridge control mode.

In the half-bridge control mode, when a voltage level of a control signal VGS1 of the first high-side switch S1 is a high voltage level, a voltage level of a control signal VGS2 of the first low-side switch S2 is a low voltage level. Conversely, when the voltage level of the control signal VGS1 of the first high-side switch S1 is a low voltage level, the voltage level of the control signal VGS2 of the first low-side switch S2 is a high voltage level.

As described above, in the half-bridge control mode, the voltage level of the control signal VGS1 of the first high-side switch S1 is a reversed voltage level of the voltage level of the control signal VGS2 of the first low-side switch S2. Therefore, in the half-bridge control mode, when the first high-side switch S1 is in an on state, the first low-side switch S2 is in an off state. Conversely, in the half-bridge control mode, when the first high-side switch S1 is in the off state, the first low-side switch S2 is in the on state.

In the half-bridge control mode, regardless of whether the voltage level of the control signal VGS1 of the first high-side switch S1 is the high voltage level or the low voltage level and the voltage level of the control signal VGS2 of the first low-side switch S2 is the high voltage level or the low voltage level, a control signal VGS3 of the second high-side switch S3 is maintained at a low voltage level and a control signal VGS4 of the second low-side switch S4 is maintained at a high voltage level.

Therefore, in the half-bridge control mode, regardless of whether the control signal VGS1 of the first high-side switch S1 is in the on-state or in the off-state and the control signal VGS2 of the first low-side switch S2 is in the on-state or in the off-state, the second high-side switch S3 is maintained in the off-state and of the second low-side switch S4 is maintained in the on-state.

That is, in the half-bridge control mode, the control circuit CTR complementarily switches the first high-side switch S1 and the first low-side switch S2, continually turns off the second high-side switch S3, and continually turns on the second low-side switch S4.

Figure 3:
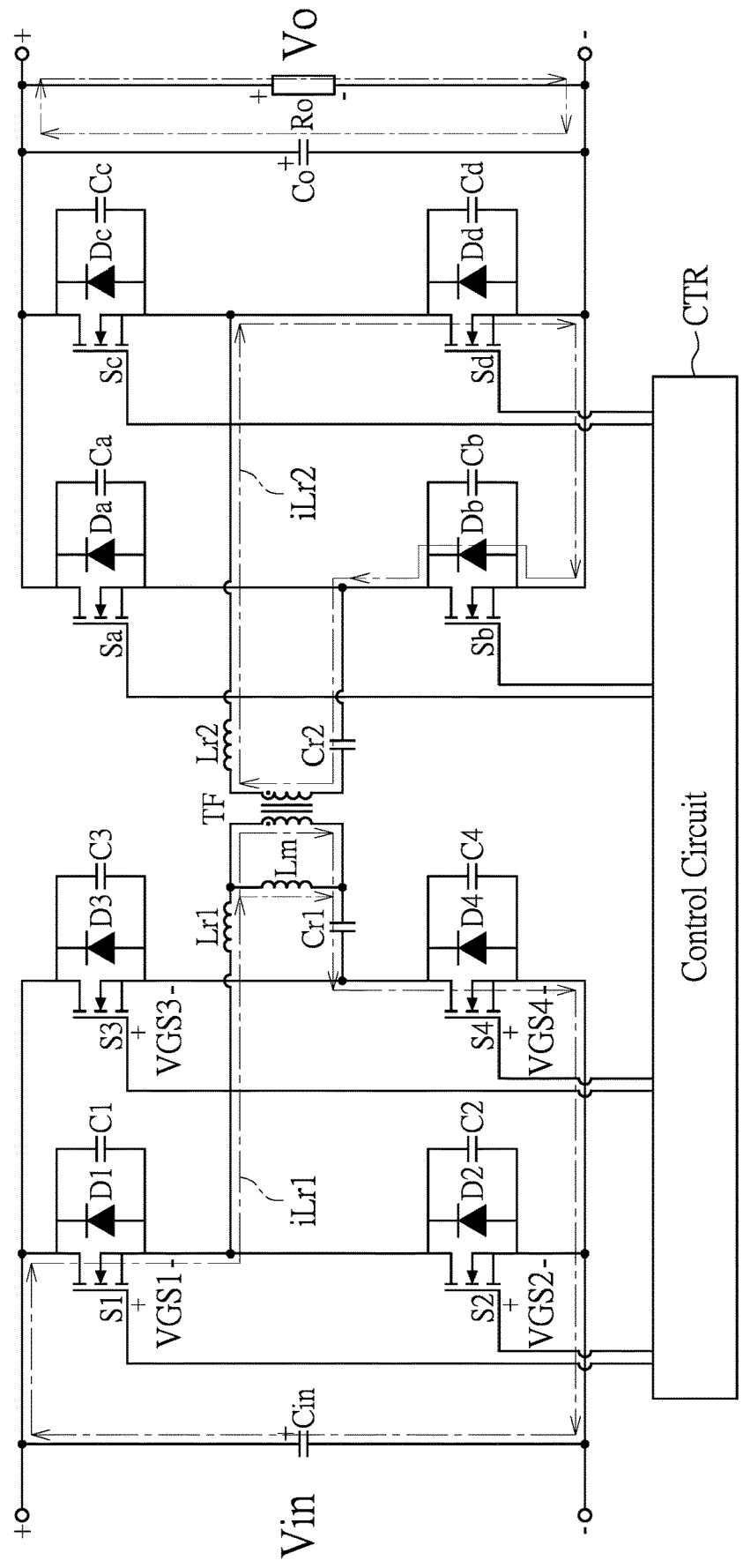
FIG. 3 is a schematic diagram of flowing paths of currents of the resonant converter being operated in a secondary-side delay conduction mode according to the embodiment of the present disclosure.
Figure 4:
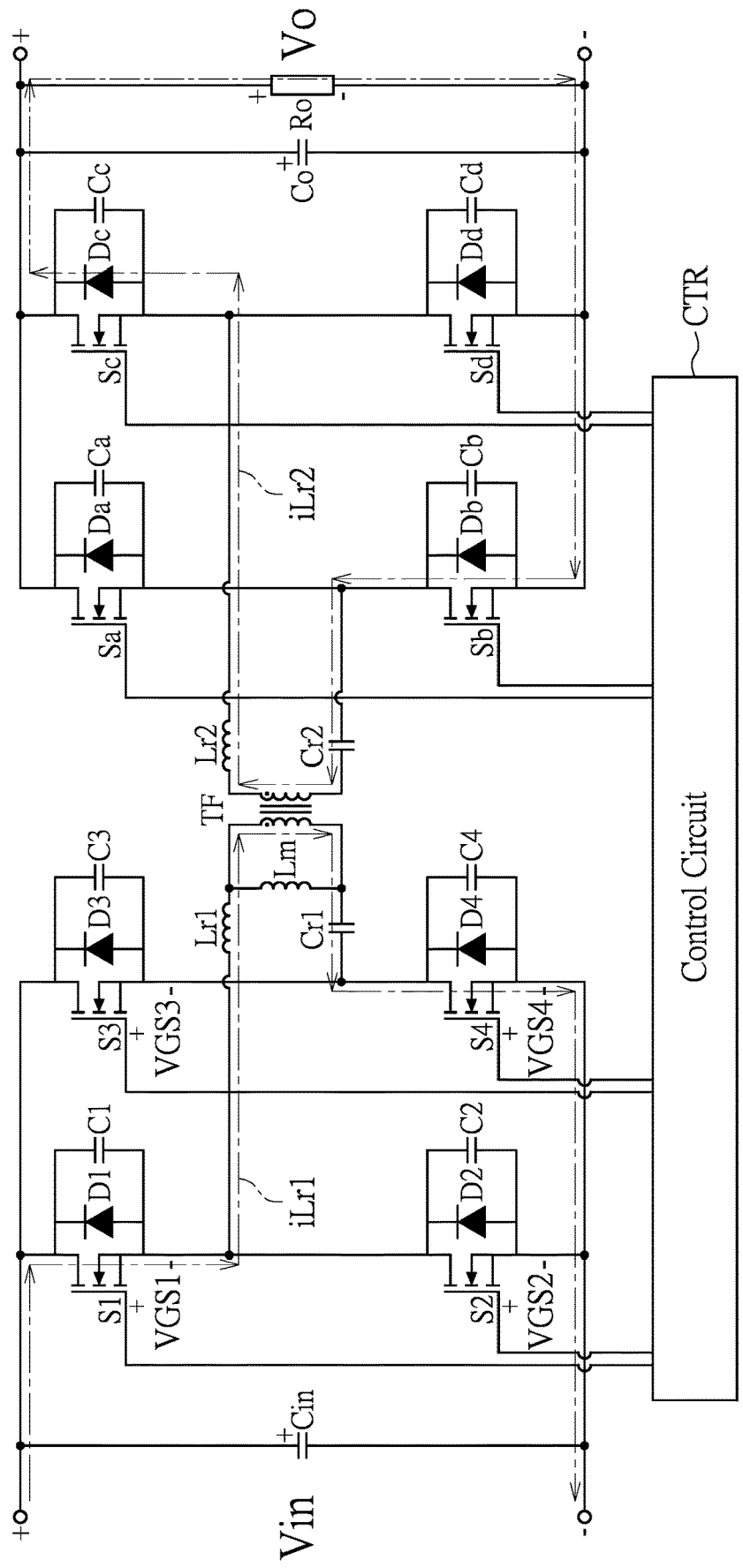
FIG. 4 is a schematic diagram of flowing paths of currents of the resonant converter being operated in the secondary-side delay conduction mode according to the embodiment of the present disclosure.
Figure 5:
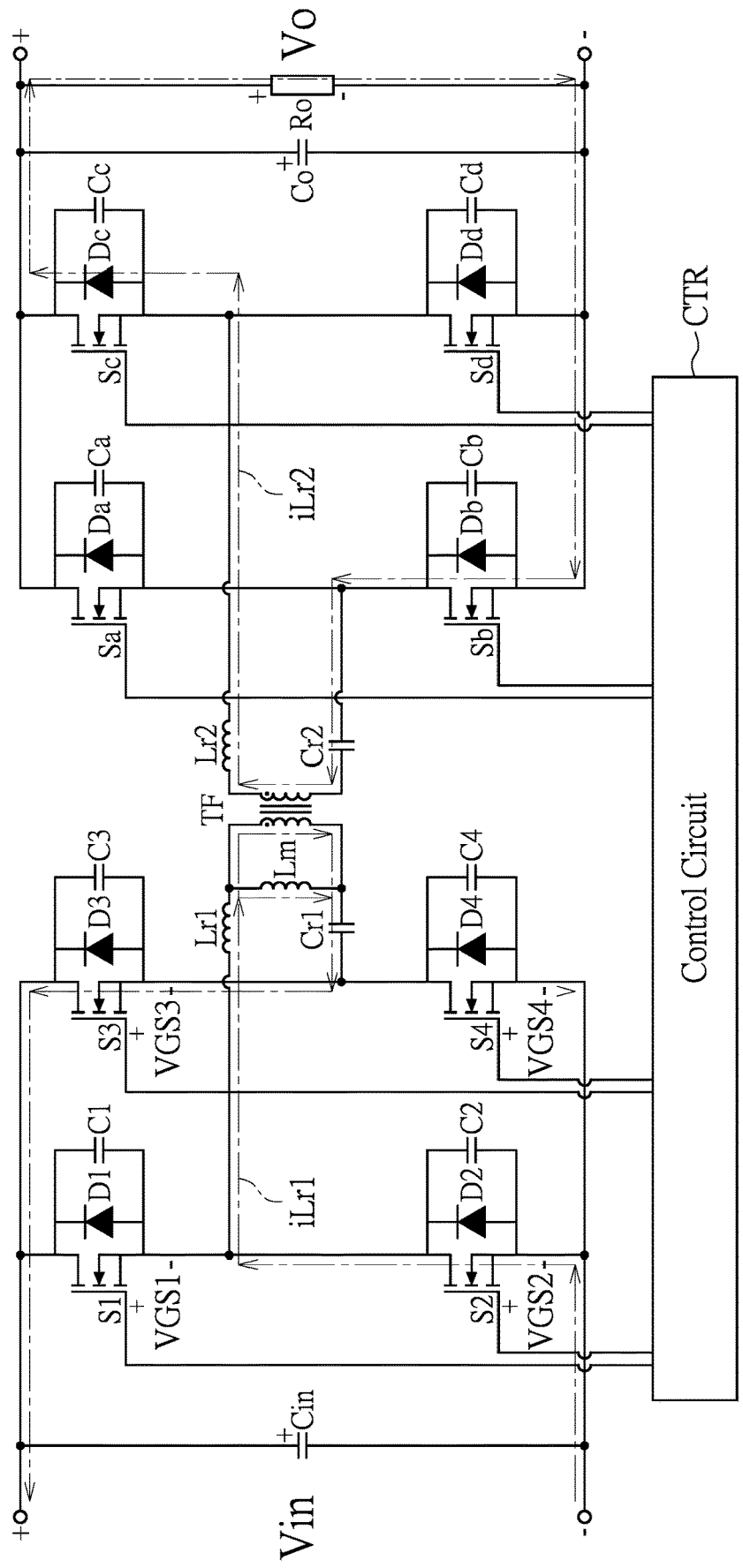
FIG. 5 is a schematic diagram of flowing paths of currents of the resonant converter being operated in the secondary-side delay conduction mode according to the embodiment of the present disclosure.
Figure 6:
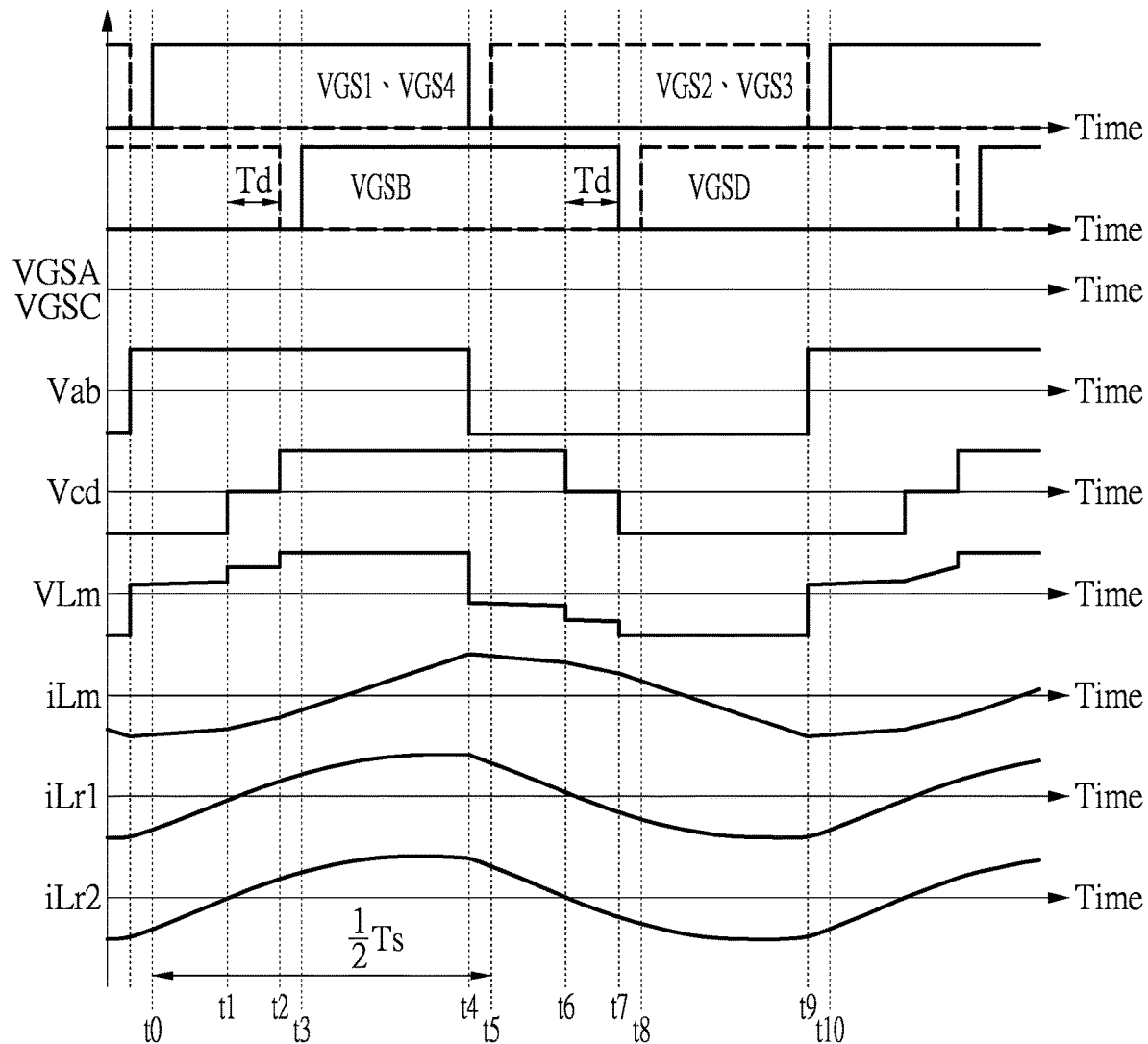
FIG. 6 is a waveform diagram of signals of the resonant converter being operated in the secondary-side delay conduction mode according to the embodiment of the present disclosure.

Reference is made to FIG. 1 and FIG. 3 to FIG. 6, in which FIG. 3 is a schematic diagram of flowing paths of currents of the resonant converter being operated in a secondary-side delay conduction mode according to the embodiment of the present disclosure, FIG. 4 and FIG. 5 are schematic diagrams of flowing paths of currents of the resonant converter being operated in the secondary-side delay conduction mode according to the embodiment of the present disclosure, and FIG. 6 is a waveform diagram of signals of the resonant converter being operated in the secondary-side delay conduction mode according to the embodiment of the present disclosure.

The resonant converter of the present disclosure may be switched to the secondary-side delay conduction mode.

The resonant converter of the present disclosure operates in a plurality of working intervals in the secondary-side delay conduction mode, such as, but not limited to a time interval between a time point t0 to a time point t1, a time interval between a time point t1 to a time point t2, a time interval between the time point t2 to a time point t3, a time interval between the time point t3 to a time point t4, a time interval between the time point t4 to a time point t5, a time interval between the time point t5 to a time point t6, a time interval between the time point t6 to a time point t7, a time interval between the time point t7 to a time point t8, a time interval between the time point t8 to a time point t9 and a time interval between the time point t9 to a time point t10, as shown in FIG. 6.

Within the time interval between the time point t0 to the time point t1 and the time interval between the time point t1 to the time point t2, the control signal VGS1 of the first high-side switch S1 and the control signal VGS4 of the second low-side switch S4 are at the high voltage level such that the first high-side switch S1 and the second low-side switch S4 of the primary-side switch circuit are in the on-state. At the same time, the control signal VGS2 of the first low-side switch S2 and the control signal VGS3 of the second high-side switch S3 are at the low voltage level such that the first low-side switch S2 and the second high-side switch S3 are in the off-state. At the same time, the control signal VGSD of the fourth low-side switch Sd is at the high voltage level such that the fourth low-side switch Sd of the secondary-side switch circuit is in the on-state. At the same time, the control signal VGSB of the third low-side switch Sb of the secondary-side switch circuit is at the low voltage level such that the third low-side switch Sb is in the off-state.

The control signal VGSA of the third high-side switch Sa and the control signal VGSC of the fourth high-side switch Sc are maintained at the low voltage level such that the third high-side switch Sa and the fourth high-side switch Sc are in the off-state at any time.

Within the time interval between the time point t1 to the time point t2, a voltage of a body diode Da of the third high-side switch Sa and a voltage of a body diode Dc of the fourth high-side switch Sc are reverse bias voltages, such that are the body diode Da of the third high-side switch Sa and the body diode Dc of the fourth high-side switch Sc are not conducted. A resonant slot including the second resonant inductor Lr2 and the second resonant capacitor Cr2 of the secondary-side resonant circuit are in a short-circuit state. At this time, as shown in FIG. 3, in a closed current loop of the secondary-side circuit, a current iLr2 flows through the second resonant inductor Lr2, the fourth low-side switch Sd and the body diode Db of the third low-side switch Sb to the second resonant capacitor Cr2. Therefore, power is stored in the second resonant capacitor Cr2 and is not transmitted through the resonant slot including the second resonant inductor Lr2 and the second resonant capacitor Cr2 of the secondary-side resonant circuit on the secondary-side of the transformer TF to the load Ro. Therefore, only a discharging current of the output capacitor Co flows to the load Ro.

It is worth noting that, within secondary-side delay conduction time Td as shown in FIG. 6, the resonant slot including the second resonant inductor Lr2 and the second resonant capacitor Cr2 of the secondary-side resonant circuit is in the short-circuit state. At this time, power is transmitted from the input power source Vin (or the input capacitor Cin charged by the input power source Vin) through the first high-side switch S1, the first resonant inductor Lr1 and the primary-side of the transformer TF to the secondary-side of the transformer TF. Then, the power is stored in the second resonant inductor Lr2 and the second resonant capacitor Cr2 of the secondary-side resonant circuit of the resonant slot.

A current iLm of the magnetizing inductor Lm, a voltage VLm of the magnetizing inductor Lm, a current iLr1 of the first resonant inductor Lr1 and a current iLr2 of the first resonant inductor Lr2 change as shown in FIG. 6. A voltage difference Vab between a voltage of the second terminal of the first high-side switch S1 and a voltage of the first terminal of the second low-side switch S4, and a voltage difference Vcd between a voltage of the second terminal of the fourth high-side switch Sc and a voltage of the first terminal of the third low-side switch Sb are shown in FIG. 6.

After the secondary-side delay conduction time Td (that is a time length of the time interval between the time point t1 to the time point t2) ends, the fourth low-side switch Sd transits from an on-state to an off-state.

At the time point t3, the third low-side switch Sb is turned on and the voltage level of the control signal VGSB of the third low-side switch Sb increases from a zero voltage.

Within the time interval between the time point t3 to the time point t4, in the primary-side circuit, the first high-side switch S1 and the second low-side switch S4 are in on-state, and the first low-side switch S2 and the second high-side switch S3 are in off-state. At this time, as shown in FIG. 4, in the primary-side circuit, the current iLr1 flows from the input power source Vin sequentially through the first high-side switch S1, the first resonant inductor Lr1, the transformer TF, the first resonant capacitor Cr1 and the fourth low-side switch Sd.

Within the time interval between the time point t3 to the time point t4, in the secondary-side circuit, the control circuit CTR only turns on the third low-side switch Sb. At this time, as shown in FIG. 4, in the secondary-side circuit, the current iLr2 flows from the second resonant capacitor Cr2 sequentially through the second resonant inductor Lr2 and the body diode Dc of the fourth high-side switch Sc to the load Ro for continually supplying power to the load Ro to increase a voltage Vo of the load Ro.

At the time point t4, the control signal VGS1 of the first high-side switch S1 and the control signal VGS4 of the second low-side switch S4 transmit from the high voltage level to the low voltage level. As a result, the first high-side switch S1 and the second low-side switch S4 transits from the on-state to the off-state.

After the time interval between the time point t3 to the time point t4 ends, the current time enters a dead time (that is, time of the time interval between the time point t4 to the time point t5).

After the time interval between the time point t4 to the time point t5 ends, the current time enters the time interval between the time point t5 to the time point t6. At the time point t5, the voltage level of the control signal VGS2 of the first low-side switch S2 and the voltage level of the control signal VGS3 of the second high-side switch S3 transit from the low voltage level to the high voltage level. At this time, the first low-side switch S2 and the second high-side switch S3 are turned on, and the voltage level of the control signal VGS2 of the first low-side switch S2 and the voltage level of the control signal VGS3 of the second high-side switch S3 increase from a zero voltage.

Within the time interval between the time point t4 to the time point t5, the first low-side switch S2 and the second high-side switch S3 are maintained in the on-state. At the same time, the third low-side switch Sb is in the on-state, and the first high-side switch S1, the second low-side switch S4 and the fourth low-side switch Sd are in the off-state. At this time, flowing paths of the current iLr1 of the first resonant inductor Lr1 and the current iLr2 of the first resonant inductor Lr2 in the secondary-side circuit as shown in FIG. 5 are maintained to be the same as that shown in FIG. 4.

At the time point t6, the current iLr2 of the first resonant inductor Lr2 decreases to a zero value. At this time, the time interval between the time point t5 to the time point t6 ends.

As described above, in the secondary-side delay conduction mode, the control circuit CTR turns on or off the first high-side switch S1 and the second low-side switch S4 at the same time.

In the secondary-side delay conduction mode, the control circuit CTR turns on or off the first low-side switch S2 and the second high-side switch S3 at the same time.

In the secondary-side delay conduction mode, the control circuit CTR complementarily switches the first high-side switch S1 and the second low-side switch S4 with the first low-side switch S2 and the second high-side switch S3.

In the secondary-side delay conduction mode, the control circuit CTR complementarily switches the fourth low-side switch Sd and the third low-side switch Sb.

In conclusion, the present disclosure provides the resonant converter having the switch on-time control mechanism. The resonant converter of the present disclosure modulates the on-times and the switching frequencies of the primary-side switch circuit and the secondary-side switch circuit. The resonant converter of the present disclosure is switched between the half-bridge control mode and the secondary-side delay conduction mode. In the half-bridge control mode, the voltage inputted into the resonant converter of the present disclosure is half of the input voltage, thereby reducing an operational frequency range. In the secondary-side delay conduction mode, on-time of the secondary-side circuit of the resonant converter of the present disclosure is delayed such that the secondary-side circuit is transitorily in the short-circuit state. At this time, the voltage of the resonant slot of the resonant converter of the present disclosure is large and a peak value of a resonant current of the resonant slot is increased. Therefore, when an operational frequency of the resonant converter of the present disclosure exceeds a resonant frequency range, the resonant converter of the present disclosure can still realize a boost function, the operational frequency range of the resonant converter of the present disclosure can be reduced, and a wide output voltage range of the present disclosure can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A resonant converter having a switch on-time control mechanism, comprising:
a primary-side switch circuit including a plurality of primary-side upper switches and a plurality of primary-side lower switches, wherein a first terminal of each of the plurality of primary-side upper switches is connected to a positive terminal of an input power source, second terminals of the plurality of primary-side upper switches are respectively connected to first terminals of the plurality of primary-side lower switches, and a second terminal of each of the plurality of primary-side lower switches is connected to a negative terminal of the input power source;
a primary-side resonant circuit connected to nodes between the second terminals of the plurality of primary-side upper switches and the first terminals of the plurality of primary-side lower switches;
a secondary-side switch circuit including a plurality of secondary-side upper switches and a plurality of secondary-side lower switches, wherein a first terminal of each of the plurality of secondary-side upper switches is connected to a first terminal of a load, second terminals of the plurality of secondary-side upper switches are respectively connected to first terminals of the plurality of secondary-side lower switches, and a second terminal of each of the plurality of secondary-side lower switches is connected to a second terminal of the load;
a secondary-side resonant circuit connected to nodes between the second terminals of the plurality of secondary-side upper switches and the first terminals of the plurality of secondary-side lower switches;
a transformer, wherein a primary-side of the transformer is connected to the primary-side resonant circuit, and a secondary-side of the transformer is connected to the secondary-side resonant circuit; and
a control circuit connected to a control terminal of each of the plurality of primary-side upper switches, a control terminal of each of the plurality of primary-side lower switches, a control terminal of each of the plurality of secondary-side upper switches and a control terminal of each of the plurality of secondary-side lower switches;

wherein the control circuit controls on-times and switching frequencies of the primary-side switch circuit and the secondary-side switch circuit to extend time within which power is transmitted from the input power source through the primary-side switch circuit, the primary-side resonant circuit and the transformer to the secondary-side resonant circuit, and stored in the secondary-side resonant circuit, such that the secondary-side resonant circuit supplies more power to the load.

2. The resonant converter according to claim 1, wherein the plurality of primary-side upper switches includes a first high-side switch and a second high-side switch, and the plurality of primary-side lower switches includes a first low-side switch and a second low-side switch;
   wherein a first terminal of the first high-side switch and a first terminal of the second high-side switch is connected to the positive terminal of the input power source, a first terminal of the first low-side switch is connected to a second terminal of the first high-side switch, a first terminal of the second low-side switch is connected to a second terminal of the second high-side switch, and a second terminal of the first low-side switch and a second terminal of the second low-side switch are connected to the negative terminal of the input power source.

3. The resonant converter according to claim 2, wherein the plurality of secondary-side upper switches includes a third high-side switch and a fourth high-side switch, and the plurality of secondary-side lower switches includes a third low-side switch and a fourth low-side switch;
   wherein a first terminal of the third high-side switch and a first terminal of the fourth high-side switch are connected to the first terminal of the load, a first terminal of the third low-side switch is connected to a second terminal of the third high-side switch, a first terminal of the fourth low-side switch is connected to a second terminal of the fourth high-side switch, and a second terminal of the third low-side switch and a second terminal of the fourth low-side switch are connected to the second terminal of the load.

4. The resonant converter according to claim 3, wherein the primary-side resonant circuit includes:
   a first resonant inductor, wherein a first terminal of the first resonant inductor is connected to a node between the first terminal of the first low-side switch and the second terminal of the first high-side switch;
   a magnetizing inductor, wherein a first terminal of the magnetizing inductor is connected to a second terminal of the first resonant inductor and a first terminal of the primary-side of the transformer; and
   a first resonant capacitor, wherein a first terminal of the first resonant capacitor is connected to a node between the first terminal of the second low-side switch and the second terminal of the second high-side switch, and a second terminal of the first resonant capacitor is connected to a second terminal of the magnetizing inductor and a second terminal of the primary-side of the transformer.

5. The resonant converter according to claim 4, wherein the secondary-side resonant circuit includes:
   a second resonant inductor, wherein a first terminal of the second resonant inductor is connected to a first terminal of the secondary-side of the transformer, and a second terminal of the second resonant inductor is connected to a node between the first terminal of the fourth low-side switch and the second terminal of the fourth high-side switch; and
   a second resonant capacitor, wherein a first terminal of the second resonant capacitor is connected to a second terminal of the secondary-side of the transformer, and a second terminal of the second resonant capacitor is connected to a node between the first terminal of the third low-side switch and the second terminal of the third high-side switch.

6. The resonant converter according to claim 3, further comprising:
   an input capacitor, wherein a first terminal of the input capacitor is connected to the positive terminal of the input power source, the first terminal of the first high-side switch and the first terminal of the second high-side switch, and a second terminal of the input capacitor is connected to the negative terminal of the input power source, the second terminal of the first low-side switch and the second terminal of the second low-side switch.

7. The resonant converter according to claim 3, further comprising:
   an output capacitor, wherein a first terminal of the output capacitor is connected to the first terminal of the load, the first terminal of the third high-side switch and the first terminal of the fourth high-side switch, and a second terminal of the output capacitor is connected to the second terminal of the load, the second terminal of the third low-side switch and the second terminal of the fourth low-side switch.

8. The resonant converter according to claim 3, wherein, in a half-bridge control mode, the control circuit complementarily switches the first high-side switch and the first low-side switch, continually turns off the second high-side switch, and continually turns on the second low-side switch.

9. The resonant converter according to claim 5, wherein, in a secondary-side delay conduction mode, the control circuit turns on or off the first high-side switch and the second low-side switch at the same time, turns on or off the second high-side switch and the first low-side switch, complementarily switches the first high-side switch and the second low-side switch with the second high-side switch and the first low-side switch, complementarily switches the third low-side switch and the fourth low-side switch, and continually turns off the third high-side switch and the fourth high-side switch.

10. The resonant converter according to claim 9, wherein, in the secondary-side delay conduction mode, the control circuit delays switching of the third low-side switch and the fourth low-side switch so as to extend time within which the second resonant capacitor and the second resonant inductor store energy, such that the secondary-side resonant circuit subsequently supplies more power to the load.

* * * * *